(12) United States Patent
Dutta

(10) Patent No.: US 7,177,901 B1
(45) Date of Patent: Feb. 13, 2007

(54) METHOD, SYSTEM, AND COMPUTER PROGRAM PRODUCT TO REDIRECT REQUESTS FROM CONTENT SERVERS TO LOAD DISTRIBUTION SERVERS AND TO CORRECT BOOKMARKS

(75) Inventor: Rabindranath Dutta, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/534,592

(22) Filed: Mar. 27, 2000

(51) Int. Cl.
*G06F 15/16* (2006.01)

(52) U.S. Cl. .................. 709/203; 709/217; 709/218; 709/225; 718/100; 718/105; 713/162; 713/169; 713/170

(58) Field of Classification Search ............. 709/105, 709/200, 217, 218, 223–227, 229, 238, 245, 709/201–203; 713/201, 169, 170, 162, 200; 707/10, 2, 9; 370/237; 718/100–105
See application file for complete search history.

(56) References Cited

U.S. PATENT DOCUMENTS

| | | | |
|---|---|---|---|
| 5,774,660 A * | 6/1998 | Brendel et al. | 709/201 |
| 5,774,670 A | 6/1998 | Montulli | 395/200.57 |
| 5,813,007 A * | 9/1998 | Nielsen | 707/10 |
| 5,826,242 A | 10/1998 | Montulli | 705/27 |
| 5,918,239 A | 6/1999 | Allen et al. | 707/526 |

(Continued)

FOREIGN PATENT DOCUMENTS

| | | | |
|---|---|---|---|
| EP | 0 889 418 A2 | | 1/1999 |
| EP | 1 041 496 A2 * | | 4/2000 |
| GB | 2 327 514 A | | 1/1999 |
| GB | 2 330 430 A | | 4/1999 |

OTHER PUBLICATIONS

Vipin Samar; Single Sign-On using Cookie for Web Applications; Enabling Technologies: Infrastructure for Collaborative Enterprises, 1999. (Wet Ice '99). Proceedings. IEEE 8ty International Workshops on Stanford, CA, USA Jun. 16-18, 1999., pp. 158-163.*
Research Disclosure, Sep. 1998; *Virtual URLs for Browsing and Searching Large Information Spaces*, pp. 1238-1239.

(Continued)

*Primary Examiner*—ThuHa Nguyen
(74) *Attorney, Agent, or Firm*—Marilyn S. Dawkins; Dillon & Yudell LLP

(57) ABSTRACT

In a system where a central load distribution server at a publicized URL redirects requests for files to a number of content servers holding identical content on the basis of dynamically determined capacity utilization of those servers, clients are prevented from directly accessing one of the content servers without first being redirected from the central load distribution server. In the event that a client attempts to access one of the content servers without first having been redirected there from the load distribution server, the client is redirected to a page containing a notice of the error, then redirected yet again to the load distribution server. For browsers in which bookmark lists may be edited by the user, facilities are provided for correcting the bookmark entry that brought the user to the protected content server rather than to the central load distribution server. In this way, the tendency of users to unintentionally or intentionally circumvent traffic routing algorithms is substantially reduced and the risk of any one content server being overwhelmed with traffic is likewise reduced.

18 Claims, 14 Drawing Sheets

U.S. PATENT DOCUMENTS

| | | | |
|---|---|---|---|
| 5,920,859 A | 7/1999 | Li | 707/5 |
| 5,958,008 A | 9/1999 | Pogrebisky et al. | 709/223 |
| 5,968,125 A * | 10/1999 | Garrick et al. | 709/224 |
| 5,999,971 A * | 12/1999 | Buckland | 709/218 |
| 6,041,360 A * | 3/2000 | Himmel et al. | 709/245 |
| 6,070,191 A * | 5/2000 | Narendran et al. | 709/226 |
| 6,081,900 A * | 6/2000 | Subramaniam et al. | 713/201 |
| 6,138,159 A * | 10/2000 | Phaal | 709/226 |
| 6,185,598 B1 * | 2/2001 | Farber et al. | 709/200 |
| 6,189,030 B1 * | 2/2001 | Kirsch et al. | 709/224 |
| 6,226,684 B1 * | 5/2001 | Sung et al. | 709/238 |
| 6,226,752 B1 * | 5/2001 | Gupta et al. | 713/201 |
| 6,249,801 B1 * | 6/2001 | Zisapel et al. | 709/105 |
| 6,289,333 B1 * | 9/2001 | Jawahar et al. | 707/2 |
| 6,360,262 B1 * | 3/2002 | Guenthner et al. | 709/226 |
| 6,389,462 B1 * | 5/2002 | Cohen et al. | 709/218 |
| 6,542,933 B1 * | 4/2003 | Durst, Jr. et al. | 709/229 |
| 6,564,254 B1 * | 5/2003 | Shoji et al. | 709/217 |
| 6,574,627 B1 * | 6/2003 | Bergadano et al. | 707/9 |
| 6,640,302 B1 * | 10/2003 | Subramaniam et al. | 713/169 |
| 6,704,282 B1 * | 3/2004 | Sun et al. | 370/237 |
| 6,813,635 B1 * | 11/2004 | Jorgenson | 709/225 |
| 6,865,605 B1 * | 3/2005 | Soderberg et al. | 709/226 |
| 2001/0045451 A1 * | 11/2001 | Tan et al. | 235/375 |
| 2005/0021863 A1 * | 1/2005 | Jungck | 709/246 |
| 2005/0114712 A1 * | 5/2005 | Devine et al. | 713/201 |

OTHER PUBLICATIONS

IBM Technical Disclosure Bulletin, vol. 40, No. 02, Feb. 1997, *Persistent Context for World Wide Web Browsers*, pp. 215-216.

New York Times (Western Edition) Issue Aug. 6, 1999, *Is Linking Always Legal ?*.

UK9-97-012, Jun. 4, 1998, *Improved Management of and Access to Information and Other Material Via the World Wide Web*.

* cited by examiner

US 7,177,901 B1

METHOD, SYSTEM, AND COMPUTER PROGRAM PRODUCT TO REDIRECT REQUESTS FROM CONTENT SERVERS TO LOAD DISTRIBUTION SERVERS AND TO CORRECT BOOKMARKS

BACKGROUND OF THE INVENTION

1. Technical Field

The present invention relates generally to distributing file server loads in data processing system networks and in particular to discouraging end users from employing bookmarks to circumvent load distribution servers. Still more particularly, the present invention relates to preventing users from directly contacting a content server protected by a load distribution algorithm rather than the load distribution server.

2. Description of the Related Art

Internet content providers whose World Wide Web sites encounter large traffic loads frequently employ several servers to handle requests for data from their sites. In such cases where several servers are employed, the content servers frequently contain identical content and requests for files are routed to the least busy server. This is accomplished by routing file requests from a client to a central load distribution server at a publicized URL and letting it redirect these requests to the least busy of several content servers where the requested file is stored. The system should allow a client to send a file request to a load distribution server that sends the forwarded file request to a content server. The content server responds by sending the requested file to the client. In this way, the routing by the load distribution server is designed to protect any one content server from being overloaded with file requests.

At the same time, almost all hypertext systems include a facility for providing easy and fast access to a user's favorite pages on the World Wide Web ("web pages"). Such a facility is often referred to as a hotlist or a bookmark list. Existing systems depict the bookmark list as a textual list of web page titles (called "bookmarks") in a pull-down menu or other list within a web browser. A typical bookmark list also permits users to add new bookmarks to the list, update the titles associated with the web pages, and display the updated lists. Many browsers also allow a program to automatically edit this list for the user.

An example of how bookmarks are created, displayed, updated, and used to access web sites is demonstrated below using the Netscape Navigator™ browser from Netscape Communications Corporation ("Netscape"). Bookmark creation is typically user initiated. First, the user launches a browser program for browsing the Internet. FIG. 9 illustrates the December 1999 home page of IBM as displayed in the web page viewer section 900 of the browser 902.

In order to save the IBM home page as a bookmark, the user selects a bookmarks menu item 904 from a menu bar 906. FIG. 10 illustrates a state of the browser 1010 after the user has selected the bookmarks menu item 1012. As FIG. 10 illustrates, selection of the bookmarks menu item displays a bookmarks pull-down menu 1000. The bookmarks pull-down menu consists of two primary components: a command section 1002 and a bookmarks section 1004. The command section initially displays an "Add Bookmark" command 1006 and an "Edit Bookmarks" command 1008. In general, the bookmarks section displays all previously saved bookmarks. The bookmarks section displayed in FIG. 10 illustrates a nine item list of previously saved bookmarks.

In order to save the current web page as a new bookmark, the user selects the "Add Bookmark" command 1006 from the command section 1002.

FIG. 11 illustrates a state of the bookmarks pull-down menu 1000 after the IBM home page has been added as entry 1100. The process of displaying a web page associated with a bookmark is also user initiated. FIG. 12 illustrates the Netscape browser user interface as it displays the home page of Texas A&M University. The example which follows illustrates how a user, who is currently displaying Texas A&M University's home page on his browser, can use the IBM bookmark 1300 (FIG. 13) to display IBM's home page using a bookmark rather than another method of navigation such as hypertext linking or typing the URL. In short, the user positions a pointing device, such as a mouse pointer, over the IBM bookmark, and actuates a mouse button to select the bookmark. In response to the user's selection, the browser displays IBM's home page as was originally done in FIG. 9.

Existing bookmark methods allow the user of a World Wide Web site to bookmark any page or server desired. Because of this, users intending to return to a particular piece of content frequently bookmark the server providing the content, one of the several content servers containing identical files previously described, rather than the central load distribution server that is designed to redirect file requests to specific servers and protect any one server from an overload of traffic. This leads to the situation where requests flow to a given server without regard to how busy that server is and the server can be overloaded by incoming requests, thereby defeating the purpose of the central load distribution server.

The problem thereby created is illustrated in FIG. 14, where the second and fourth clients 1412 and 1410 have bookmarked the load distribution server 1400 and the first and third clients 1406 and 1408 have set their bookmarks to refer to the server 1402 that actually provides the content. As can be seen from the drawing, the second and fourth clients 1412 and 1410 send their file requests 1418 and 1420 to the load distribution server 1400. The load distribution server 1400, as expected, redirects one of the requests 1426 to the first content server 1402 and the other of the requests 1422 to the second content server 1404. This arrangement should result in balanced loading of the two servers and protect any one content server from being overloaded with file requests.

However, that the first and third clients 1406 and 1408 have also sent their file requests 1414 and 1416 to the first content server 1402. This leaves the first content server sending out three files 1436, 1430, and 1432 to the first, third, and fourth clients 1406, 1408, and 1412 while the second content server 1404 sends only the second file 1434 to the second client 1410. The first content server bears 75% of the load and the second carries only 25% of the load. Because of this, users of the first content server 1402 are likely to experience perceptible degradations in the performance of the server as well as the risk of lost file requests. The owner of the servers suffers the risk of a server crash as well as the perception that his site provides poor service in the form of loss of or delays in processing file requests. Both users and server administrators suffer real and non-trivial consequences from the ability of users to bookmark content servers.

It would be desirable, therefore, to be able to prohibit the user from accessing the several content servers where identical files are stored without first accessing the central load distribution server that allots the work to the several content servers. It would further be advantageous if the method of prohibiting the user from accessing the several content servers automatically referred him to the central server. Lastly, a further advantage would be gained by modifying the user's bookmarks to insure that his next attempt to access the same World Wide Web page was routed through the central load distribution server.

SUMMARY OF THE INVENTION

It is therefore one object of the present invention to distribute file server loads in data processing system networks.

It is another object of the present invention to discourage end users from employing bookmarks to circumvent load distribution servers.

It is yet another object of the present invention to prevent users from directly contacting a server protected by a load distribution algorithm rather than the load distribution server.

The foregoing objects are achieved as is now described. In a system where a central load distribution server at a publicized URL redirects requests for files to a number of content servers holding identical content on the basis of dynamically determined capacity utilization of those servers, clients are prevented from directly accessing one of the content servers without first being redirected from the central load distribution server. In the event that a client attempts to access one of the content servers without first having been redirected there from the load distribution server, the client is redirected to a page containing a notice of the error, then redirected yet again to the load distribution server. For browsers in which bookmark lists may be edited by the user, facilities are provided for correcting the bookmark entry that brought the user to a protected content server rather than to the central load distribution server. In this way, the tendency of users to unintentionally or intentionally circumvent traffic routing algorithms is substantially reduced and the risk of any one content server being overwhelmed with traffic is likewise reduced.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
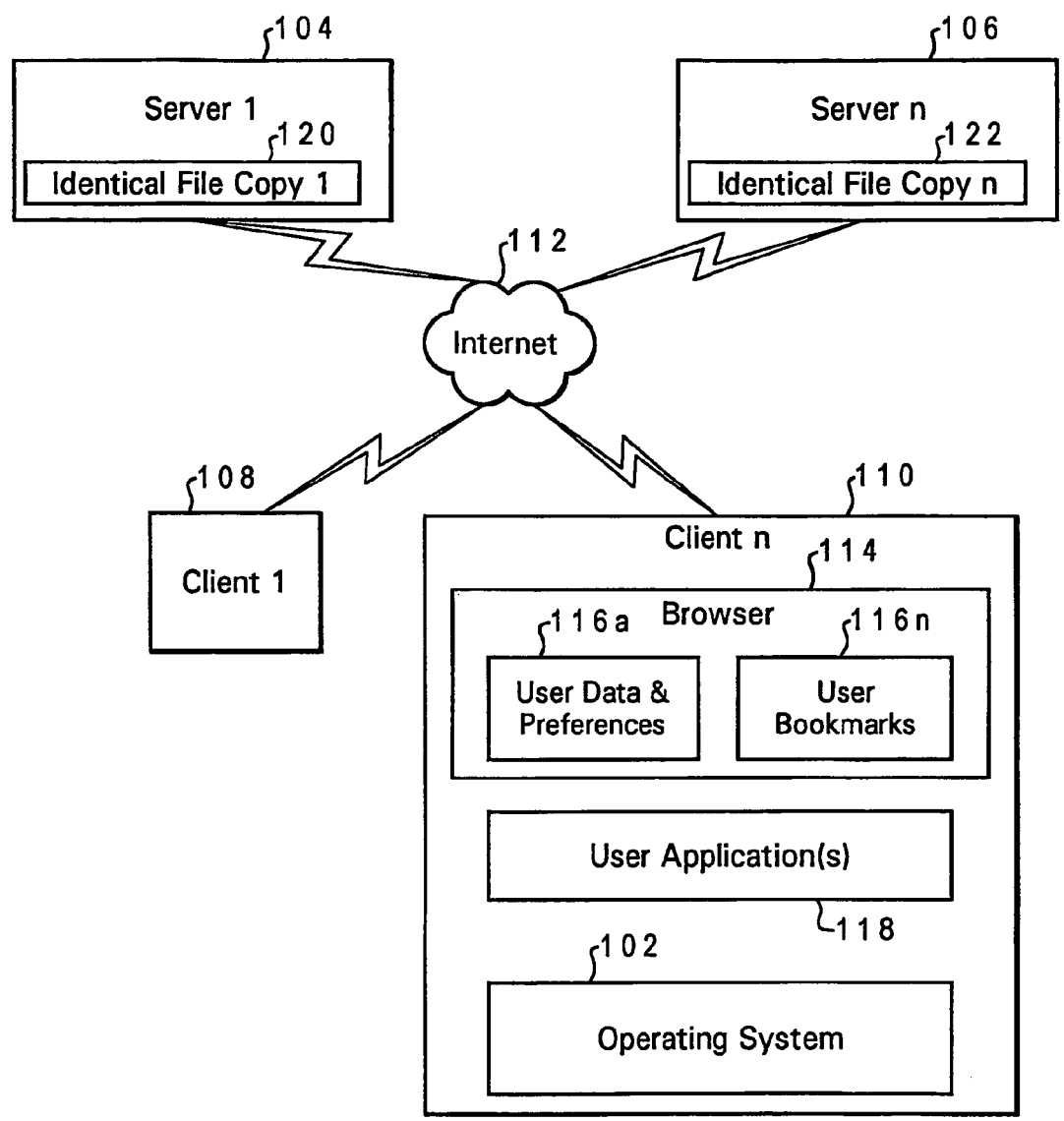
FIG. 1 depicts a data processing system network in accordance with the preferred embodiment of this invention.

With reference now to the figures, and in particular with reference to FIG. 1, a data processing system network in which a preferred embodiment of the present system may be implemented is depicted. In this environment, n servers 104 and 106 provide web page content in response to requests from n clients 108 and 110. In the particular case portrayed in FIG. 1, identical copies 120 and 122 of the content are carried on multiple servers. By placing identical copies on multiple servers, a re-directing arrangement of load servers and content servers may be implemented which will allow a load distribution server to protect any given content server from being overload with file requests. This can be accomplished in the preferred embodiment over a packetized data network supporting the hypertext transport protocol (HTTP) such as the Internet 112. An individual client 110 will typically contain a variety of user applications 118 and other software programs. One of the programs running on the client will typically be the operating system (hereafter OS) 102 that facilitates the interaction between a given program and the hardware of the machine as well as the interactions between programs. Another of the programs running on the client could be the web browser 114. Among its other constituent parts, the web browser may have a set of data files 116*a* through 116*n*. Among these data files could be stored a data structure containing the user's bookmarks 116*n*.

Figure 2:
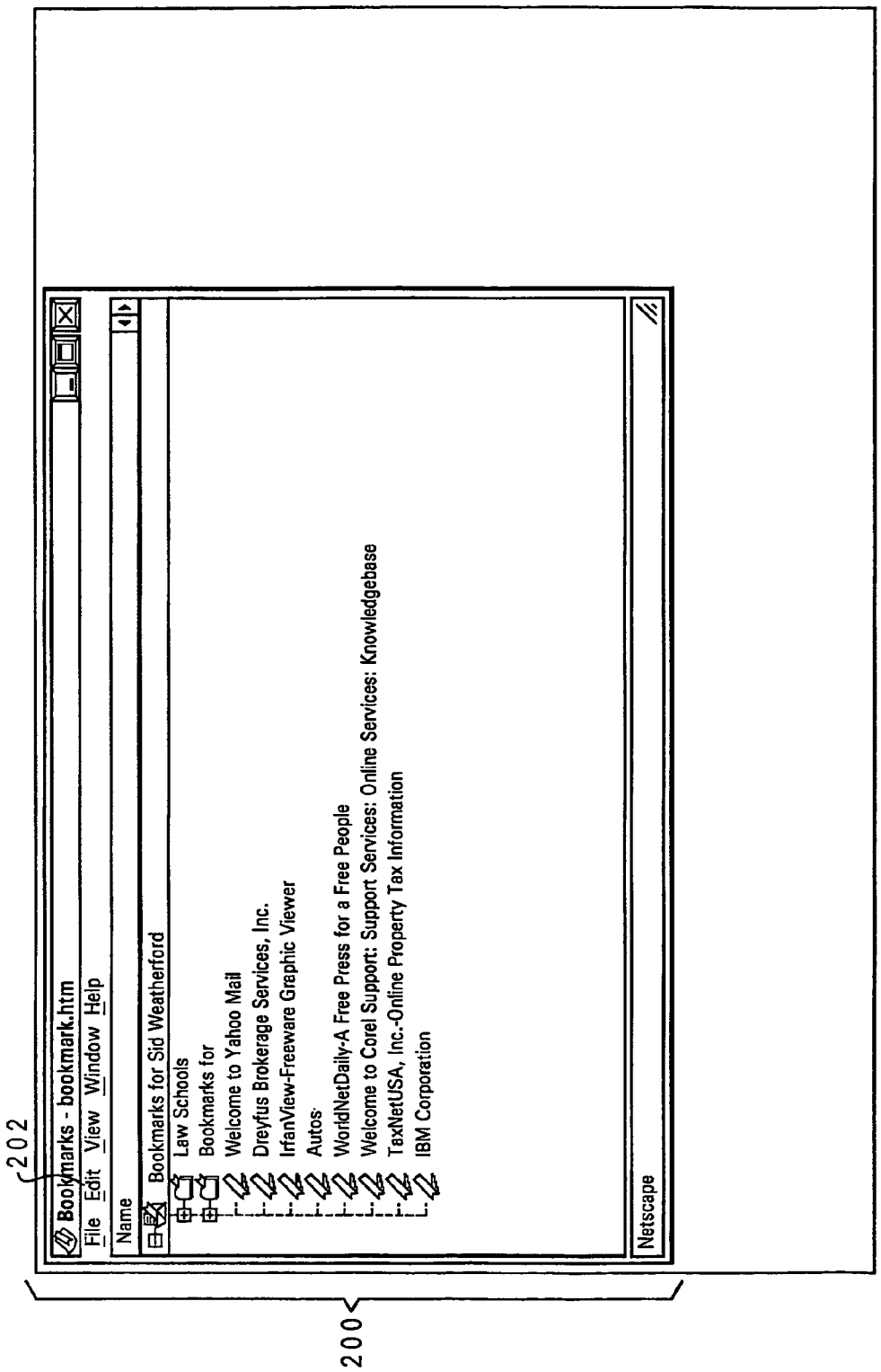
FIG. 2 shows the Bookmarks dialogue box of a web browser in accordance with the preferred embodiment of this invention.
Figure 10:
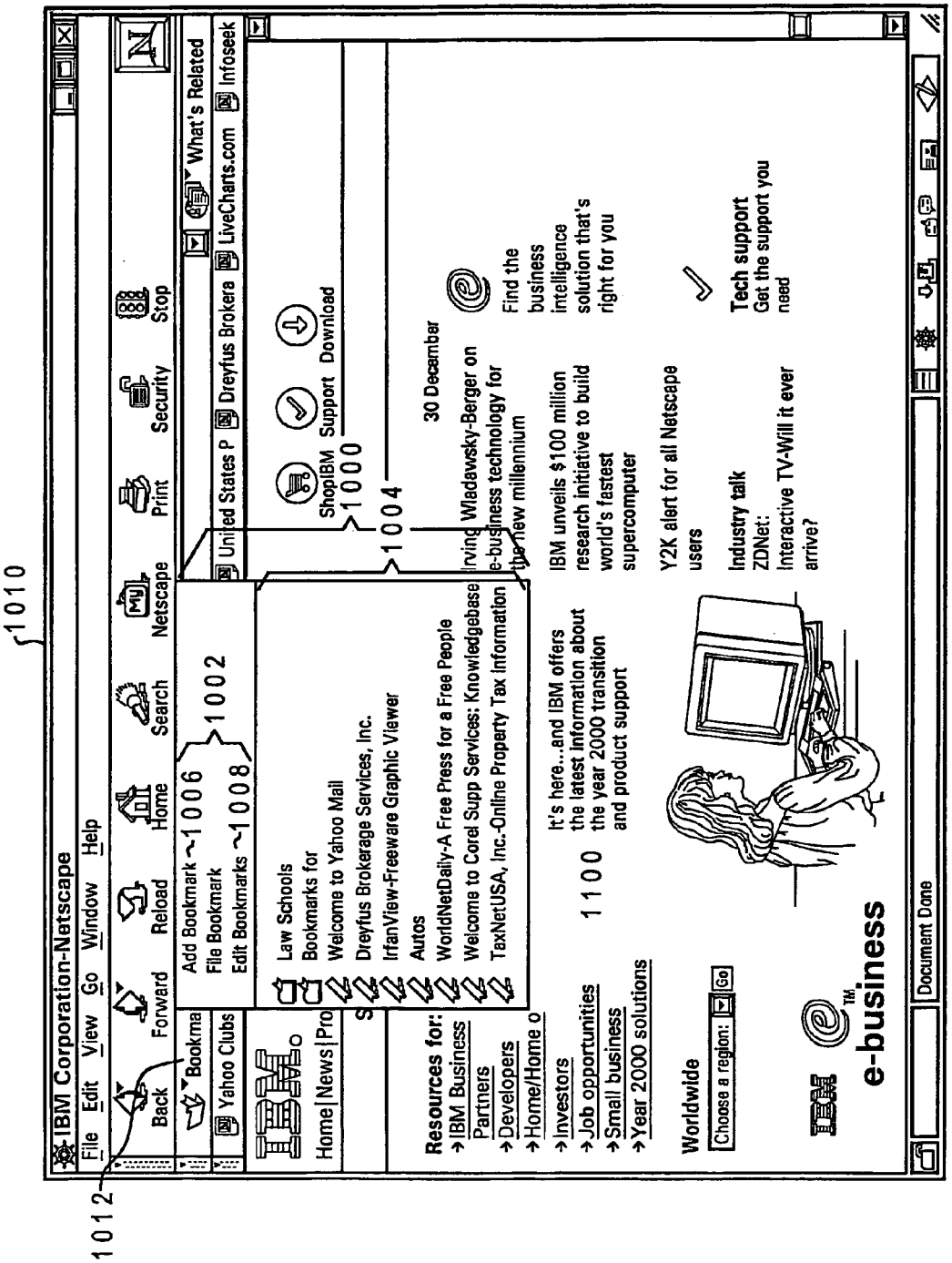
FIG. 10 illustrates a state of the browser after the user has selected the bookmarks menu item.
Figure 11:
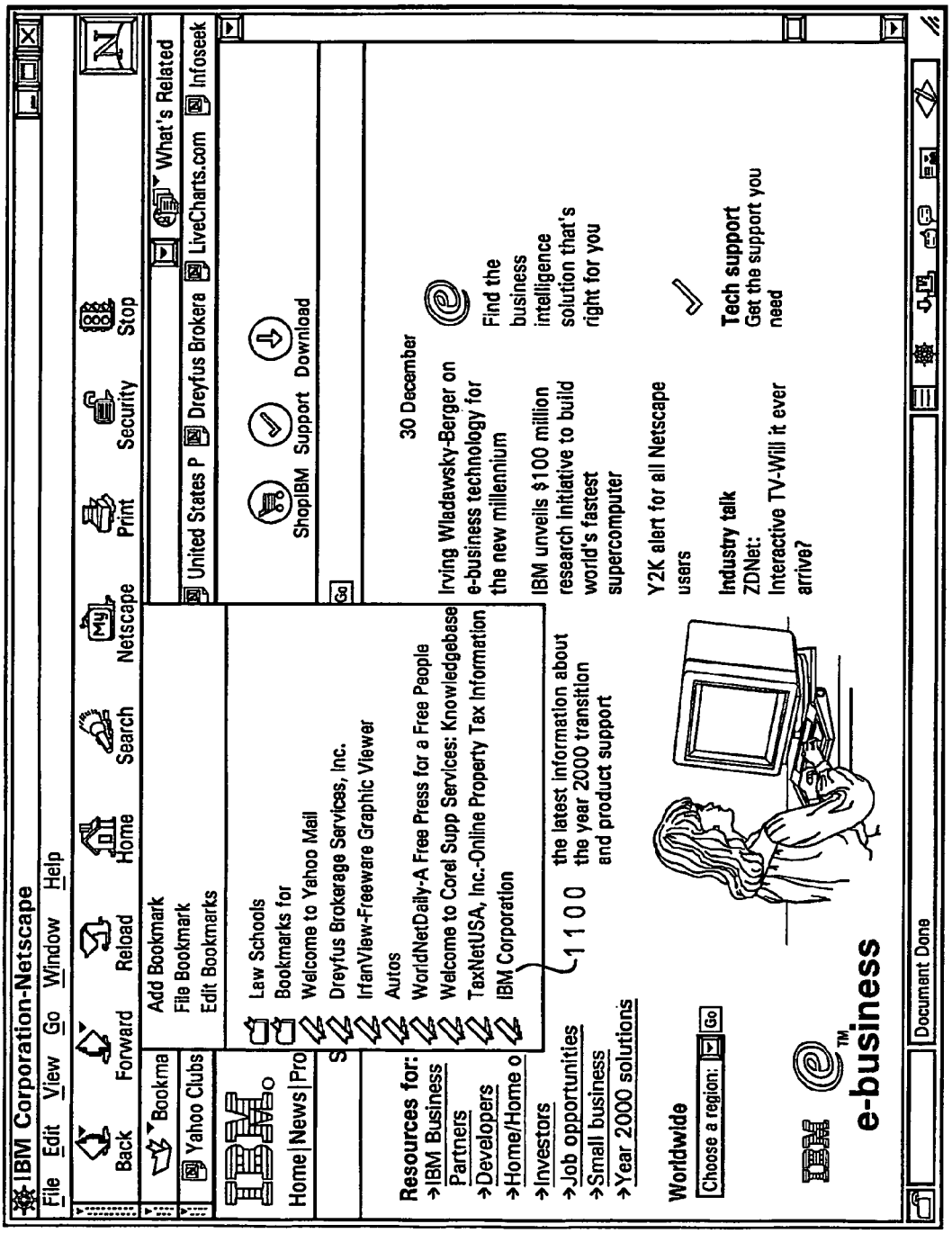
FIG. 11 illustrates a state of the bookmarks pull-down menu after the IBM home page has been added as an entry.
Figure 12:
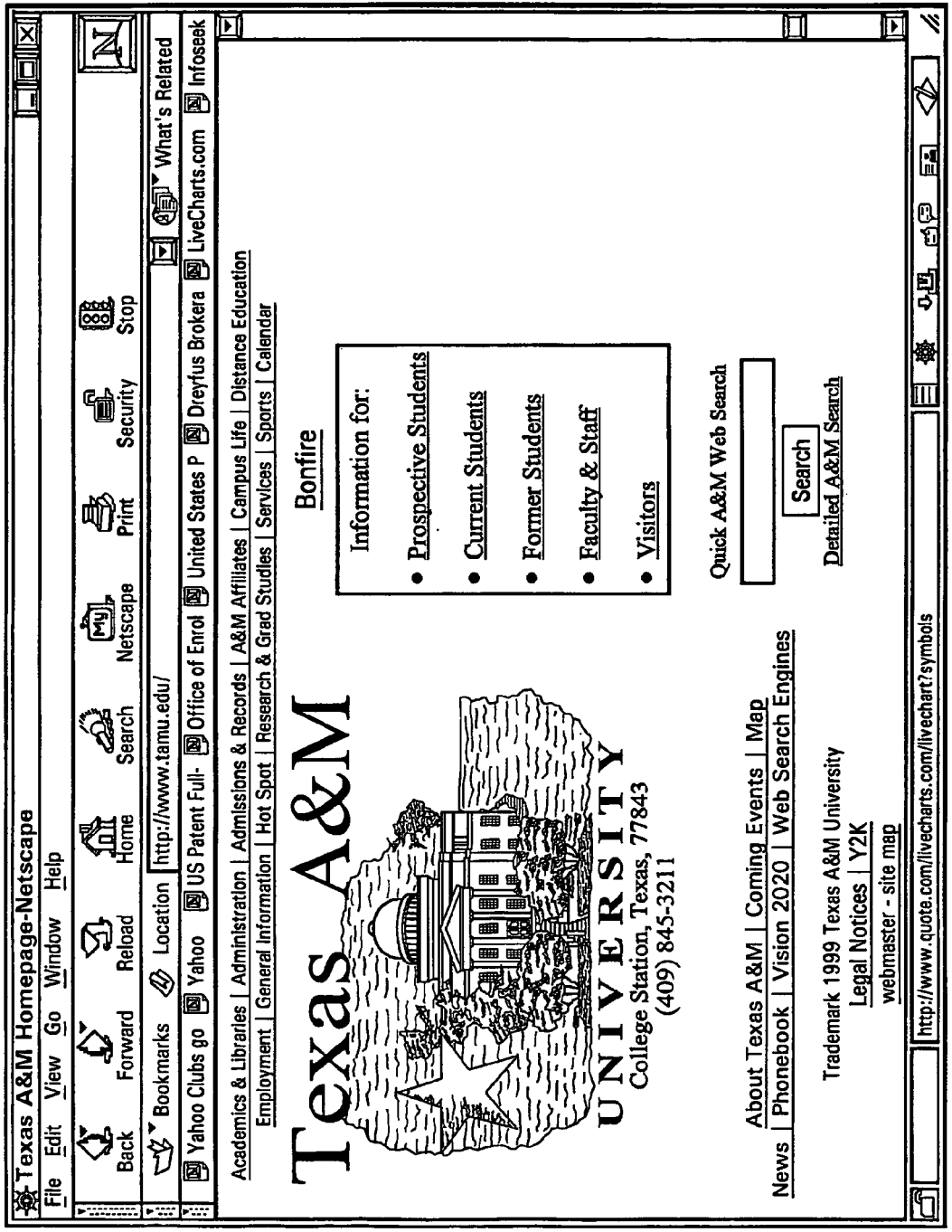
FIG. 12 illustrates the Netscape browser user interface as it displays Texas A&M University's December 1999 home page.
Figure 13:
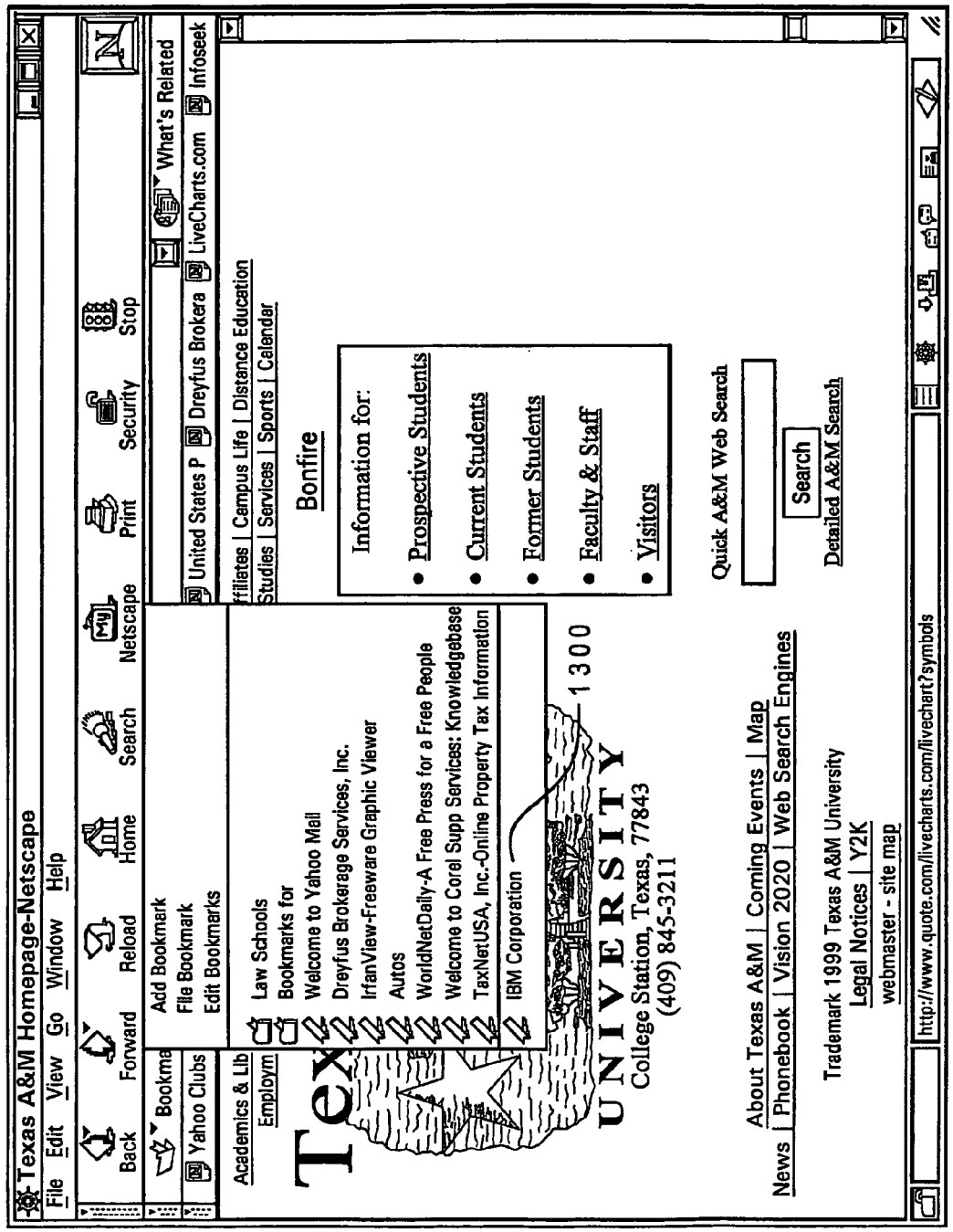
FIG. 13 illustrates a state of the Netscape Browser after the bookmarks pull-down menu has been activated while the browser is pointed to Texas A&M University's home page and the IBM bookmark is visible.
Figure 14:
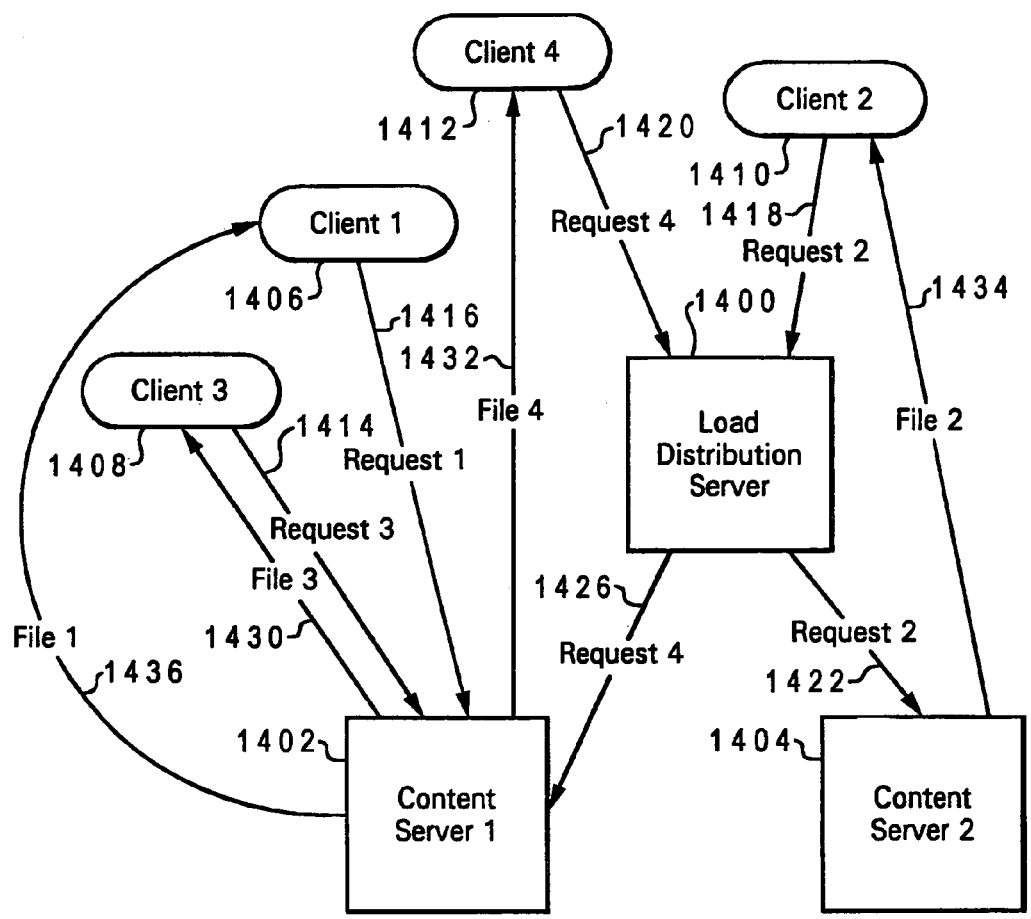
FIG. 14 depicts a data processing system network in which several clients have requested files by sending requests to content servers and load distribution servers, thereby causing an imbalance of the load on the two content servers portrayed in the diagram.

The process of updating a bookmark is generally user initiated. Referring now to FIG. 10 and FIG. 2, the user first selects the "edit Bookmarks" command 1008 from the command section 1002. FIG. 2 illustrates the bookmarks dialog box 200 displayed in response to actuation of the "Edit Bookmarks" 1008 command from the bookmarks pull-down menu. The dialog box 200 displays a list of the bookmarks currently stored by the browser.

Figure 3:
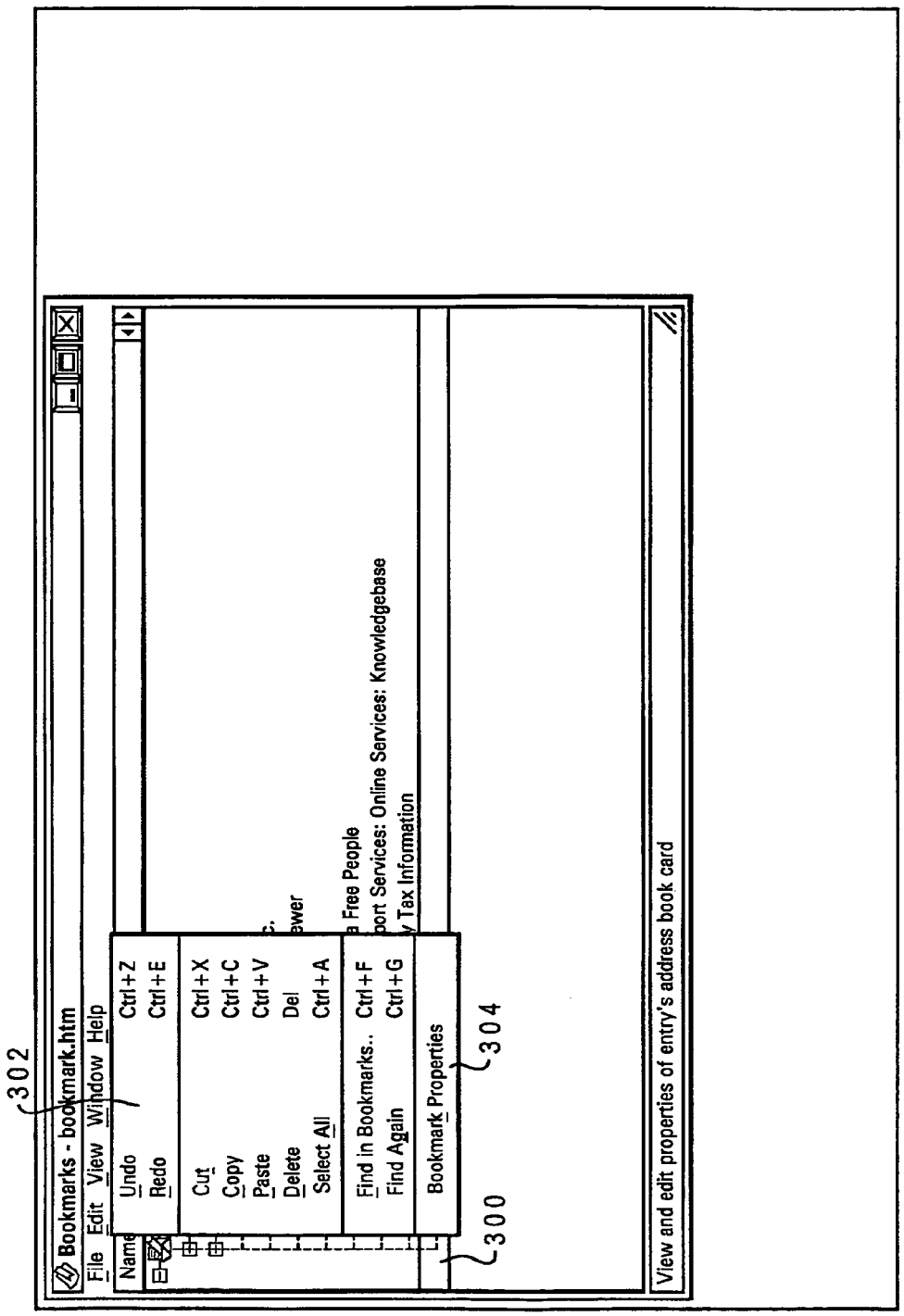
FIG. 3 illustrates the Bookmarks dialogue box with the Edit menu selected.
Figure 4:
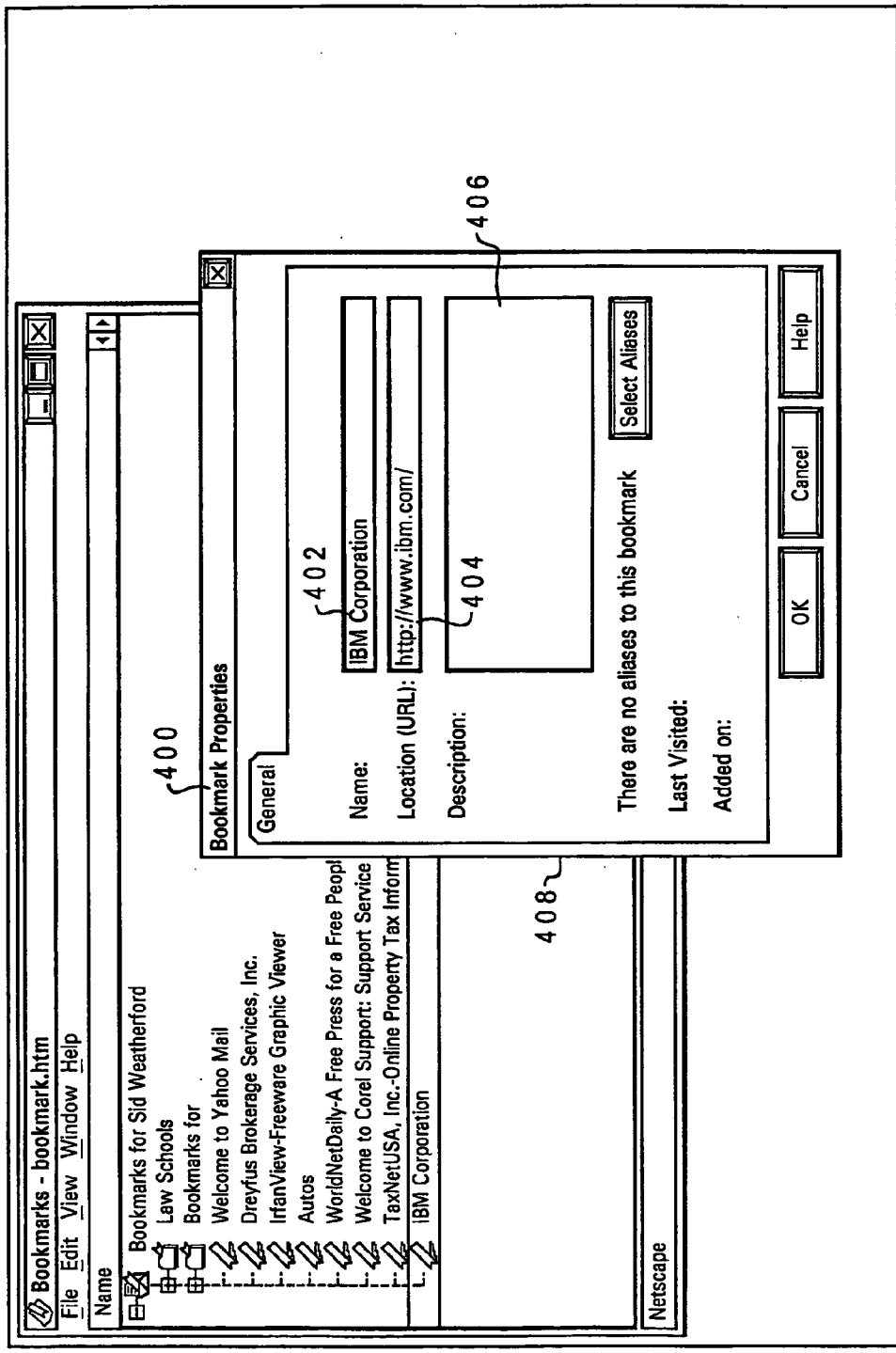
FIG. 4 shows the bookmark properties dialogue box.

FIG. 3 illustrates a state of the dialog box after the user has traversed the list of bookmarks, arrived at entry 300 containing the IBM bookmark, and selected the edit menu pull-down menu 302 from the command menus. By acuating the bookmark properties menu item 304, the properties dialog box 400 (FIG. 4) appears. Referring now to FIG. 4, dialog box 400 contains additional property modification blanks 402, 404, and 406. Property modification blank 402 allows a user to change the name displayed for this bookmark in the bookmark list. Property modification blank 404 allows a user to change the URL to which this bookmark points. Property modification blank 406 allows a user to insert a description of the bookmark. A user employs the property modification blanks to update data associated with bookmarks from the bookmark list. Additionally, property display item 408 tells the user the date on which the bookmark was last visited and property display item 410 informs the user of the date of creation of the bookmark.

Figure 5:
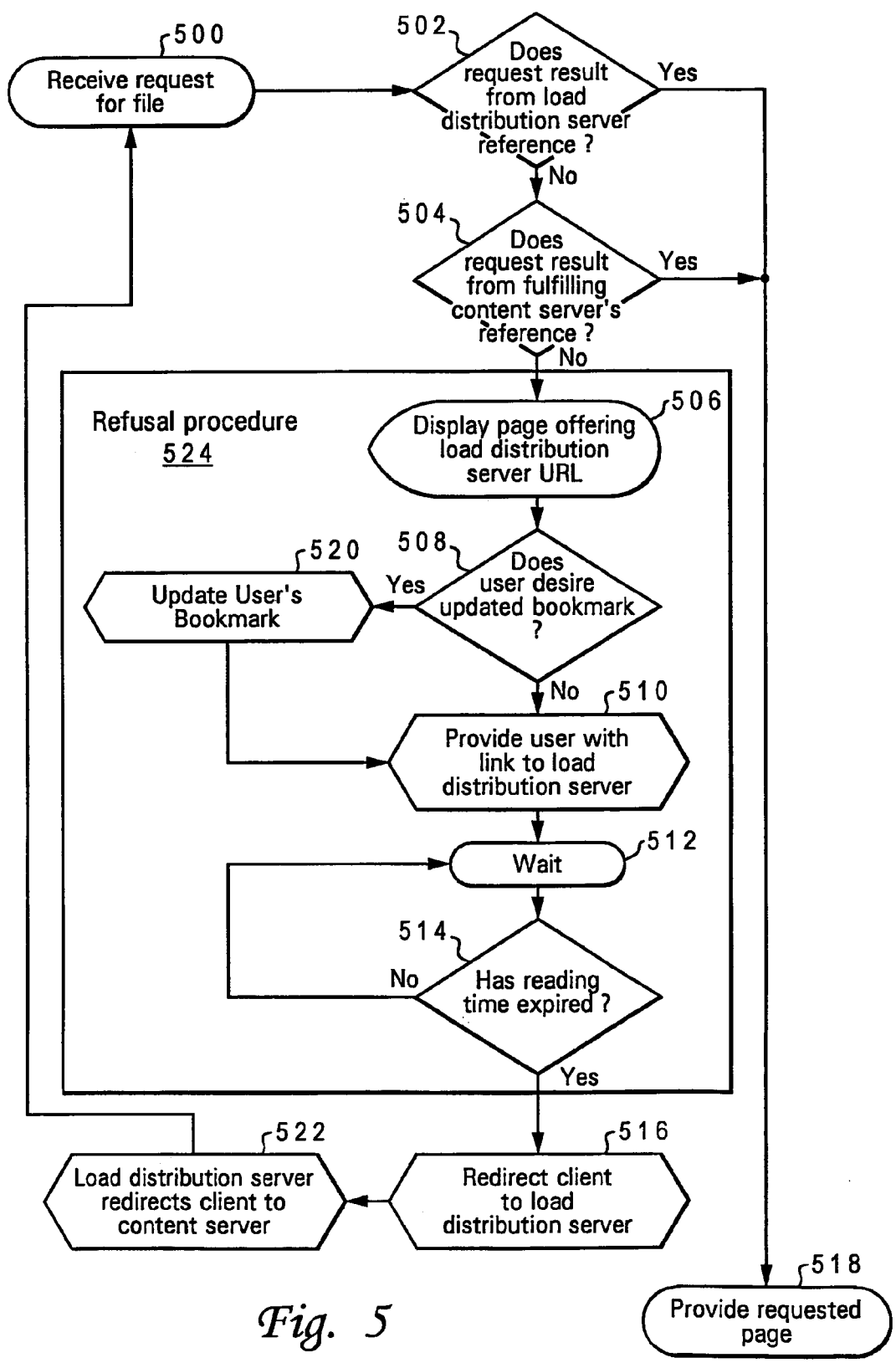
FIG. 5 is a flowchart detailing the operation of the of the preferred embodiment of the present invention, a software system allowing content servers to refuse file requests not originating as references from that server or a load distribution server.
Figure 6:
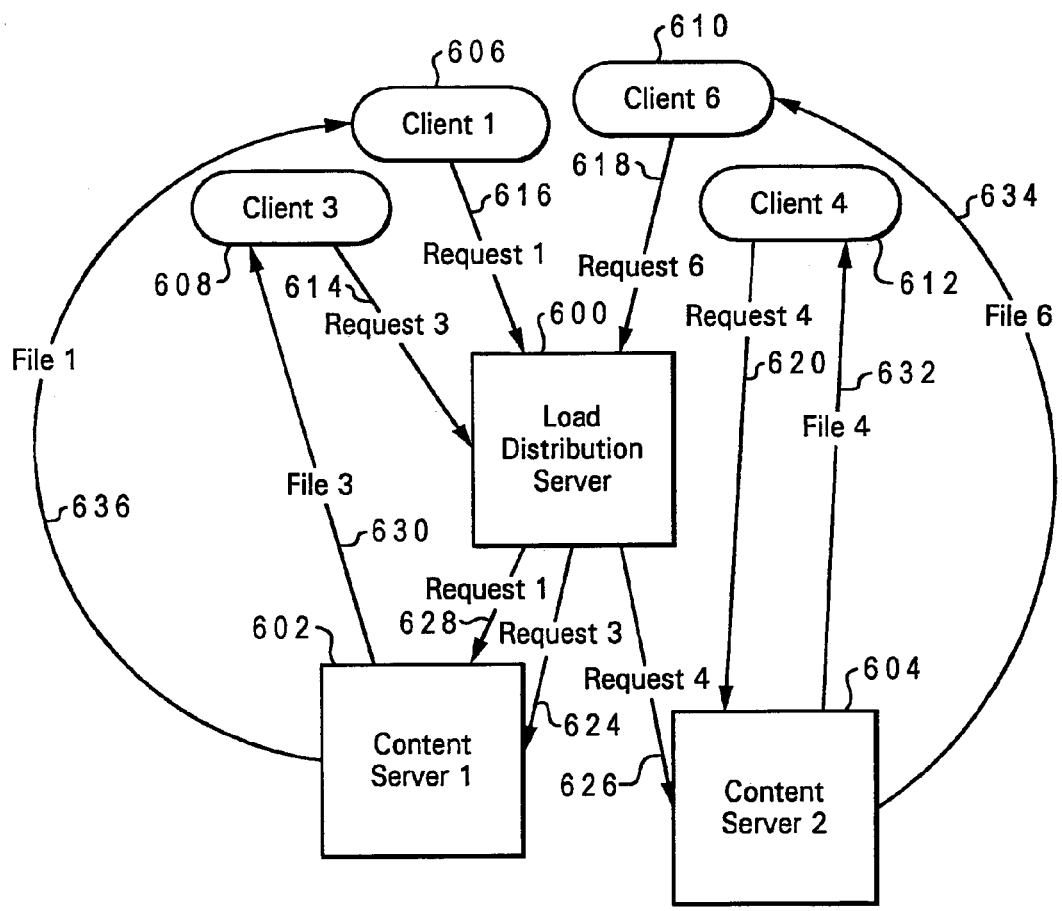
FIG. 6 illustrates the proper operation of an load distribution server as it re-directs file requests from clients to a series of content servers in the absence of attempts by users of the clients to directly bookmark the content servers rather than the load distribution server.
Figure 9:
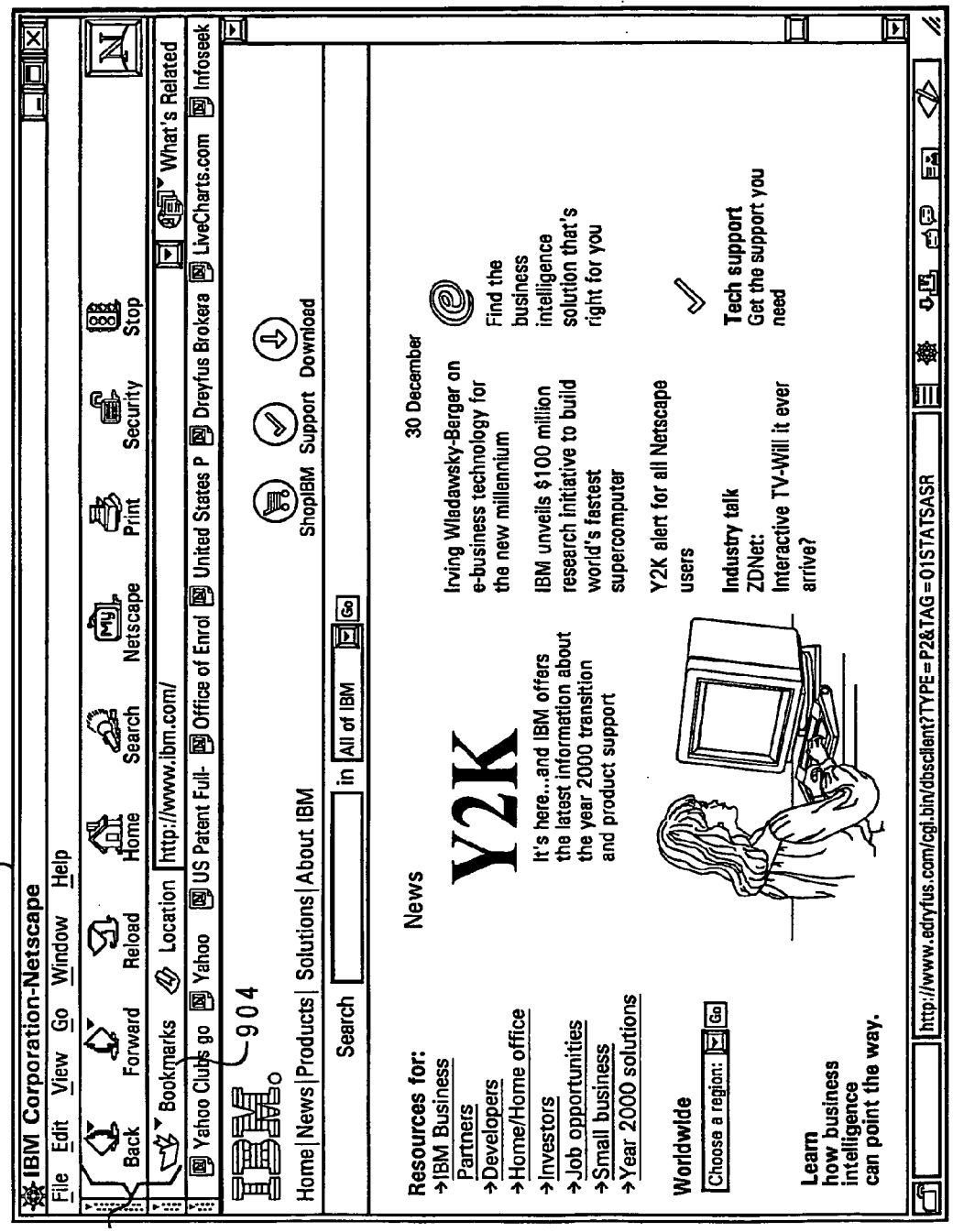
FIG. 9 illustrates the December 1999 home page of IBM as displayed in the web page viewer section of a web browser as is conventionally available.

The preferred embodiment shall function as is detailed in FIG. 5, a flowchart explaining the interactions of servers and clients involved in the current invention, and FIG. 6, a diagram depicting the proper operation of a load distribution server as it re-directs file requests from clients to a series of content servers in the absence of attempts by users of the clients to directly bookmark the content servers rather than the load distribution server. Also recalling FIG. 9 and FIG. 1, prior to Step 500, a client 608 running a web browser 902, requests a file, which is stored in identical copies as 120 and 122 on servers 106 and 104. At Step 500, the server 602 receives the file request and at Step 502 determines whether the file request has originated as the result of a reference from a load distribution server 600. If the request did originate as a reference from a load distribution server, the process proceeds to Step 518 and the server 602 provides the requested page to the client. Such a request is illustrated in FIG. 6 as the request 616 from the first client 606 is sent to the load distribution server 600 and referred to the content server 602. The file request is then answered as the request file 636 is sent to the client 606.

Returning to Step 502 and determining whether the file request has originated as the result of a reference from a load distribution server 600, if the request did not originate as a reference from an load distribution server, the process proceeds to Step 504 and the server 602 determines whether the request originated as a reference from the content server 602. This can be determined in a number of ways, the easiest of which being the setting on the client of a cookie with a time stamp at the time of initial contact in each download session. That cookie would then be sent to the content server with each request for a file from the content server. If the time stamp on this cookie indicates that a certain length of time has transpired, then the content server would assume that the request had originated from a bookmark rather than a reference from the content server in the course of a single browsing session. Other methods for accomplishing this detection also exist and would not depart from the scope of the present invention. If the request originated as a reference from the content server 602, then the content server provides the requested page to the client. Such a request is illustrated in FIG. 6 as the request 620 from the fourth client 612 is sent to the second content server 604. The file request is then answered as the request file 632 is sent to the client 612.

Provided that the file request from the client originates as neither a reference from the load distribution server nor as a reference from the content server, the procedure of the preferred embodiment now moves to Step 506, the first step of the refusal procedure 524. In Step 506 the content server sends a file, generally in the form of a web page, informing the user to directly contact the load distribution server at the main, publicized URL. This same file or another file offers the user the opportunity to update his bookmark for that page in Step 508.

If the user does desire to update his bookmark, then the procedure of the preferred embodiment continues to Step 520 where the content server sends a file, typically a Java applet, containing instructions to edit the bookmark file to reflect the correct page. Recalling FIG. 4, wherein the bookmark properties dialogue box 400 contains a property modification blank 404 that allows a user to change the URL to which a bookmark points, it also possible for the program to write to the bookmark file and to change the URL. Assume, for the sake of hypothetical example, that the URL pointed to a server called BigBlue2.IBM.com, a server of the type discussed as content servers 602 and 604 throughout the body of this specification that receive requests for work through the load distribution server 600 at www.ibm.com.

When Step 520 sent the instructions to the client to update the bookmark held by the web browser, it could function in a variety of ways. First, it could directly edit the bookmark file 116*n*. Secondly, it could simulate access to the Bookmark properties dialogue box 400 by simulating use of the mouse and keyboard to provide input to the web browser 902 running on the client. In doing that, it could directly edit the content of the Property Modification box 404 that contains the URL to which the bookmark points, changing it to www.ibm.com. In either case, the modification could be achieved automatically, without any user input beyond requesting that the file containing instructions for the modification be sent to the user's machine.

Either Step 520 or Step 508 will then lead to Step 510, providing the user with a link containing the URL of the load distribution server and additional instructions for automatically redirecting the user's client to send a page request to the load distribution server after a given time. The procedure then calls for the instructions to wait (Step 512) and determine whether the given time has expired (Step 514), repeating this process cyclically until time has expired. When time has expired, the refusal procedure 524 completes and the client subsequently sends a redirected request to the load distribution server (Step 516).

In Step 522, the load distribution server redirects the client to the content server and the process returns to Step 500. This time, however, the question of Step 502, determining whether the file request has originated as the result of a reference from a load distribution server 600, is answered in the affirmative and the requested file is sent.

Figure 7:
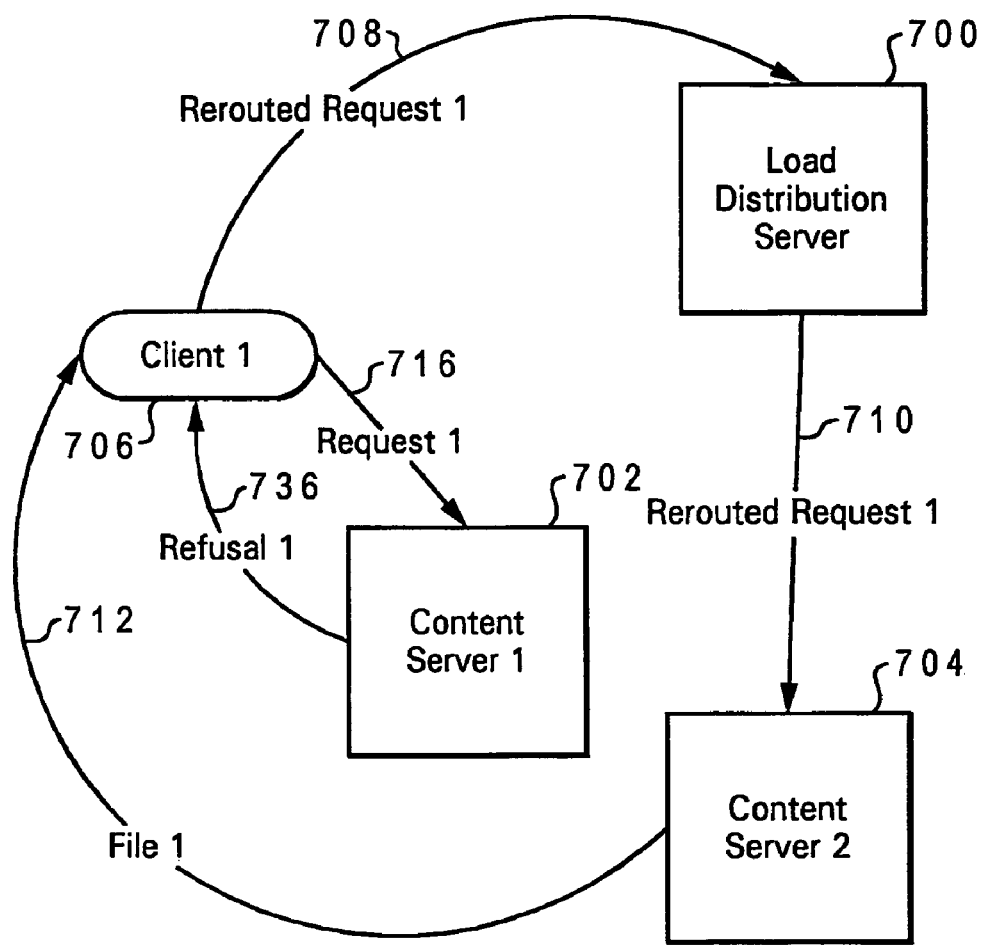
FIG. 7 illustrates the process of rerouting a file request by a single client that sent its request directly to a content server without first sending it to a load distribution server in accordance with a preferred embodiment of the present invention.

The traffic of files in the refusal 524 and redirection steps is illustrated in FIG. 7. The client 706 sends the initial file request 716 prior to the initiation of Step 500 in the previous discussion. This is received by the content server 702 and Step 502 and Step 504 determine that the request has originated from an improper bookmark. The refusal procedure of Step 524 is then sent as "refusal 1" 736. At the behest of the content server in Step 516, the client sends a redirected request 708 for the original file to the load distribution server 700. The load distribution server then reroutes this request 710 to the content server 704 in accordance with Step 522. This time, however, the question of Step 502, determining whether the file request has originated as the result of a reference from an load distribution server 700, is answered in the affirmative and the requested file 712 is sent.

Figure 8:
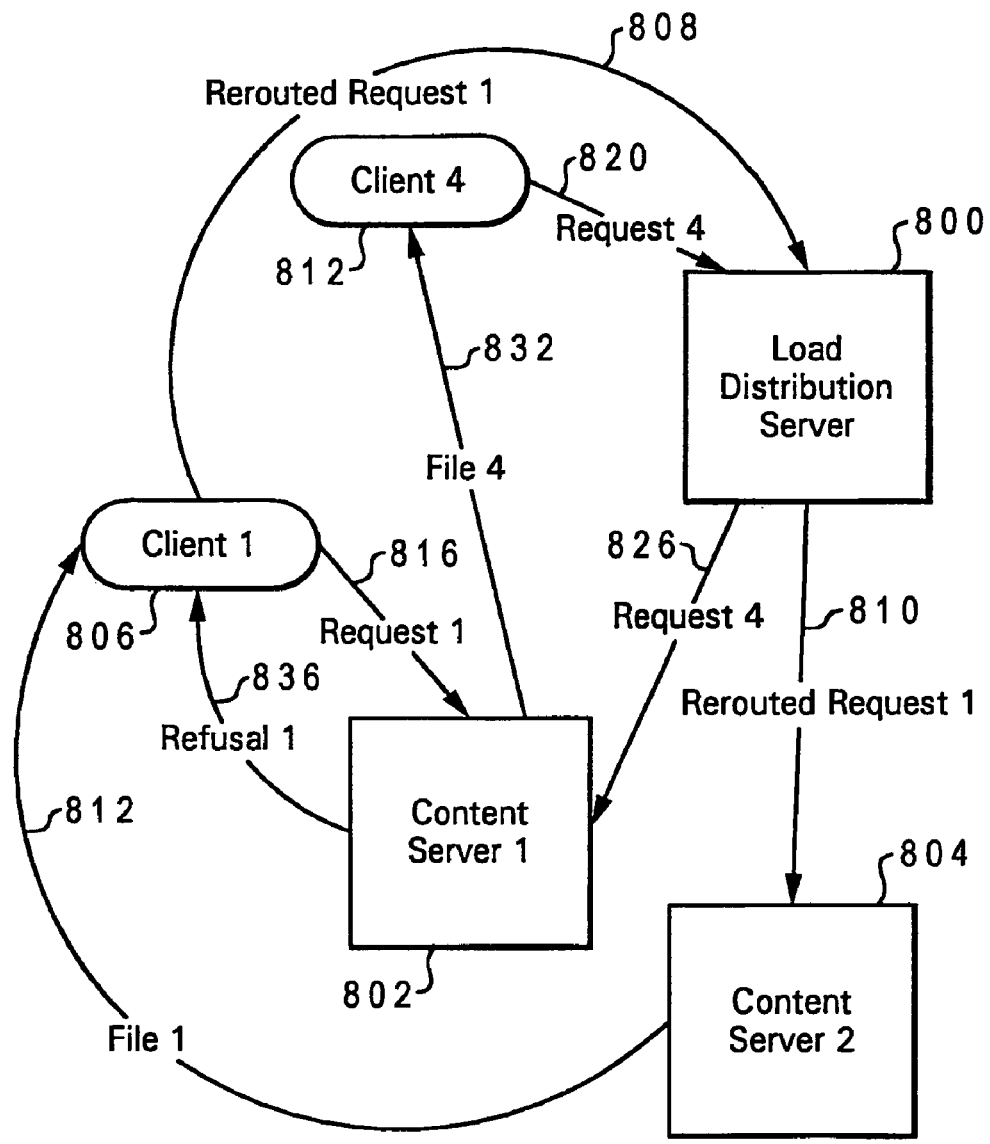
FIG. 8 illustrates, in accordance with the preferred embodiment of this invention, the ability of the load distribution server to balance content server loading in the presence of requests from multiple clients when the content server is able to refuse file requests sent directly to it.

Use of the preferred embodiment allows for the situation demonstrated in FIG. 8, a diagram for the flow of files showing that the load distribution server effectively balances the load on content servers when the redirection of requests resulting from improper bookmarks is allowed. In this example, the fourth client 812 submits a file request 820 to the load distribution server 800 while the first client 806 submits a file request 816 to the first content server 802. The request 820 from the fourth client 812 is re-directed 826 to the first server 802 and the requested file 832 is sent. At Step 500, the server 802 receives the file request 826 and at Step 502 determines that the file request has originated as the result of a reference from an load distribution server 800. Because the request did originate as a reference from a load distribution server 800, the process proceeds to Step 518 and the server 802 provides the requested page 832 to the client 812.

In the case of the request 816 from the first client 806 however, the request was not sent through a load distribution server 800 and the request 816 is refused 836. This refusal occurs in the steps previously outlined in FIG. 5. Because Step 502 determines that the request did not originate as a reference from a load distribution server 800, the process proceeds to Step 504 and the content server 802 determines whether the request originated as a reference from the content server 802. In the case illustrated here, the file request from the client 806 originated as neither a reference from the load distribution server 800 nor as a reference from the content server 802 and the procedure of the preferred embodiment now moves to Step 506, the first step of the refusal procedure 524. In Step 506 the content server sends a file, generally in the form of a web page, informing the user to directly contact the load distribution server at the main, publicized URL. This same file or another file offers the user the opportunity to update his bookmark for that page in Step 508.

If the user does desire to update his bookmark, then the procedure of the preferred embodiment continues to Step 520 where the content server sends a file, typically a Java applet, containing instructions to edit the bookmark file to reflect the correct page.

Either Step 520 or Step 508 will then lead to Step 510, providing the user with a link containing the URL of the load distribution server and additional instructions for automatically redirecting the user's client to send a page request to the load distribution server after a given time. The procedure then calls for the instructions to wait (Step 512) and determine whether the given time has expired (Step 514), repeating this process cyclically until time has expired. When time has expired, the refusal procedure 524 completes and the client 806 subsequently sends a redirected request 808 to the load distribution server (Step 516).

As stated above, after the refusal, the request of the client is rerouted 808 to the load distribution server 800. The load distribution server reroutes the request 810 to the unused second content server 804, which sends the file 812 to the first client 806. This is portrayed in FIG. 5 as Step 522, where the load distribution server redirects the client to the content server and the process returns to Step 500. This time, however, the question of Step 502, determining whether the file request has originated as the result of a reference from a load distribution server 800, is answered in the affirmative and the requested file is sent. In this way, the content servers are subjected to an equal load and the purpose intended by the placement of the load distribution server is fulfilled.

It is important to note that while the present invention has been described in the context of a fully functional data processing system and/or network, those skilled in the art will appreciate that the mechanism of the present invention is capable of being distributed in the form of a computer usable medium of instructions in a variety of forms, and that the present invention applies equally regardless of the particular type of signal bearing medium used to actually carry out the distribution. Examples of computer usable mediums include: nonvolatile, hard-coded type mediums such as read only memories (ROMs) or erasable, electrically programmable read only memories (EEPROMs), recordable type mediums such as floppy disks, hard disk drives and CD-ROMs, and transmission type mediums such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method of preventing a client from directly contacting a content server that is protected by a load distribution server from an overload of traffic, comprising:
   receiving, at said content server, a request by the client for a file from said content server;
   determining, at said content server, whether said request originated as a reference from the load distribution server and determining whether said request originated as a reference from said content server itself;
   responsive to determining that said request originated as a reference from a set consisting of the load distribution server and said content server, said content server providing the requested file to the client;
   determining whether said request received from said content server originated as a reference from neither of the set consisting of the load distribution server and said content server; and
   responsive to determining that the client's request to receive the file from said content server originated as the reference from neither of the set consisting of the load distribution server and said content server, sending to the client a file requesting that the client contact the load distribution server, such that the client is prevented from directly accessing the file at said content server without first being redirected from the load distribution server.

2. The method of claim 1, further comprising:
   including in the file requesting that the client contact the load distribution server a means by which the client may directly contact the load distribution server through an initiative of a user of the client.

3. The method of claim 1, further comprising:
   offering in the file requesting that the client contact the load distribution server a means to update a bookmark file to include the load distribution server.

4. The method of claim 3, wherein said set consisting of the load distribution server and said content server is a first set and said method further comprises:
   offering in one of a second set consisting of the file requesting that the client contact the load distribution server and the means to update the client's bookmark file to include the load distribution server a means to update the bookmark file to exclude said content server.

5. The method of claim 1, wherein the step of determining whether said client's request to receive said file from said content server originated as a reference from said content server further comprises determining, based on the recently of a time stamp contained within a client's request to receive a file from said content server, whether said client's request to receive said file from said content server originated as a reference from said content server.

6. The method of claim 1, further comprising:
including in the file requesting that the client contact the load distribution server a means by which to allow a user of the client sufficient time to read and react to the file requesting that the user of the client contact the load distribution server before contact with the load distribution server is established without intervention of the user.

7. A machine-readable storage medium having a plurality of instructions readable by a machine embodied therein, wherein said plurality of instructions, when processed by said machine, causes said machine to perform a method for preventing a client from directly contacting a content server that is protected by a load distribution server from an overload of traffic, said method comprising:
receiving, at said content server, a request by the client for a file from said content server;
determining, at said content server, whether said request originated as a reference from the load distribution server and determining whether said request originated as a reference from said content server itself;
responsive to determining that the request originated as a reference from a set consisting of the load distribution server and said content server, said content server providing the requested file to the client;
determining whether said request received from said content server originated as a reference from neither of the set consisting of the load distribution server and said content server; and
responsive to determining that the client's request to receive the file from said content server originated as the reference from neither of the set consisting of the load distribution server and said content server, sending to the client a file requesting that the client contact the load distribution server, such that the client is prevented from directly accessing the file at said content server without first being redirected from the load distribution server.

8. The machine-readable storage medium of claim 7, said method further comprising:
including in the file requesting that the client contact the load distribution server a means by which the client may directly contact the load distribution server through an initiative of a user of the client.

9. The machine-readable storage medium of claim 7, said method further comprising:
offering in the file requesting that the client contact the load distribution server a means to update a bookmark file to include the load distribution server.

10. The machine-readable storage medium of claim 9 wherein:
said set consisting of the load distribution server and said content server is a first set and said method further comprises:
offering in one of a second set consisting of the file requesting that the client contact the load distribution server and the means to update the client's bookmark file to include the load distribution server a means to update the bookmark file to exclude said content server.

11. The machine-readable storage medium of claim 7, wherein the step of determining whether said client's request to receive said file from said content server originated as a reference from said content server further comprises determining, based on the recently of a time stamp contained within a client's request to receive the file from said content server, whether said client's request to receive said file from said content server originated as a reference from the said content server.

12. The machine-readable storage medium of claim 7, said method further comprising:
including in the file requesting that the client contact the load distribution server a means by which to allow a user of the client sufficient time to read and react to the file requesting that the user of the client contact the load distribution server before contact with the load distribution server is established without intervention of the user.

13. A system for preventing a client from directly contacting a content server that is protected by a load distribution server from an overload of traffic, comprising:
means for receiving, at said content server, a request by the client for a file from said content server;
means for determining, at said content server, whether said request originated as a reference from the load distribution server and for determining whether said request originated as a reference from said content server itself;
means for, responsive to determining that the request originated as a reference from a set consisting of the load distribution server and said content server, for providing the requested file to the client;
means for determining whether said request received from said content server originated as a reference from neither of the set consisting of the load distribution server and said content server; and
means for, responsive to determining that the client's request to receive the file from said content server originated as the reference from neither of the set consisting of the load distribution server and said content server, sending to the client a file requesting that the client contact the load distribution server, such that the client is prevented from directly accessing the file at said content server without first being redirected from the load distribution server.

14. The system of claim 13, further comprising:
means for including in the file requesting that the client contact the load distribution server a selectable element by which the client may directly contact the load distribution server through an initiative of a user of the client.

15. The system of claim 13, further comprising:
means for offering in the file requesting that the client contact the load distribution server a selectable element that can be selected to update a bookmark file to include the load distribution server.

16. The system of claim 15, wherein said system further comprises:
means for including, in the file requesting that the client contact the load distribution server, a selectable element for updating the bookmark file to exclude said content server.

17. The system of claim 13, wherein the means for determining whether said client's request to receive said file from said content server originated as a reference from said content server further comprises means for determining, based on the recently of a time stamp contained within a client's request to receive the file from said content server, whether said client's request to receive said file from said content server originated as a reference from said content server.

18. The system of claim 13, further comprising:
means for allowing a user of the client sufficient time to read and react to the file requesting that the user of the client contact the load distribution server before contact with the load distribution server is established without intervention of the user.

* * * * *